United States Patent

[11] 3,607,052

[72] Inventor David Solan
 Berkeley, Calif.
[21] Appl. No. 833,727
[22] Filed June 16, 1969
[45] Patented Sept. 21, 1971
[73] Assignee The United States of America as represented by the Secretary of the Army

[54] TETRAPHOSPHORUS HEXAFLUORIDE AND METHOD FOR PRODUCTION AND STABILIZATION THEREOF
6 Claims, No Drawings

[52] U.S. Cl. .................................................. 23/205
[51] Int. Cl. .................................................. C01b 9/08
[50] Field of Search .......................................... 23/205

[56] References Cited
OTHER REFERENCES

Solan et al., " The Thermal Dissociation of Diphosphoros Tetrafluoride and the Formation of Tetraphosphrus Hexafluoride," Chemical Communications, No. 23, Dec. 4, 1968, pp. 1540–41.

Primary Examiner—Oscar R. Vertiz
Assistant Examiner—G. Alvaro
Attorneys—Harry M. Saragovitz, Edward J. Kelly, Herbert Berl and Robert P. Gibson ABSTRACT: The novel compound tetraphosphorus hexafluoride ($P_4F_6$) is prepared by subjecting $P_2F_4$ gas to a high temperature and low pressure and collecting the resultant products on an adjacent surface which is maintained at liquid nitrogen temperature. The collected deposit is then warmed to room temperature to volatilize the various components therein, and the $P_4F_6$ is separated and collected by low-temperature fractional distillation. $P_4F_6$ dissolved in carbon disulfide is stabilized at room temperature.

TETRAPHOSPHORUS HEXAFLUORIDE AND METHOD FOR PRODUCTION AND STABILIZATION THEREOF

The invention described herein may be manufactured, used, and licensed by or for the Government for governmental purposes without the payment to me of any royalty thereon.

This invention relates to the novel compound $P_4F_6$, method of preparation and stabilization thereof.

It is an object of this invention to provide and disclose the novel compound $P_4F_6$.

It is a further object of this invention to provide and disclose a method for the preparation of $P_4F_6$.

It is a further object of this invention to provide and disclose a method for the stabilization of $P_4F_6$ at room temperature.

Other objects and a fuller understanding of the invention may be had by referring to the following description and claims.

Tetraphosphorus hexafluoride is prepared by passing $P_2F_4$ gas at a rate of about 0.4 millimole per minute through a furnace heated to a temperature of approximately 750° to 950° C. and pressures of 2 or 3 torr. The resultant products pass from the furnace by a collision-free path and are collected on an adjacent surface which is maintained at liquid nitrogen temperature, e.g., 77° K. The condensation process must be carried out immediately upon the exit of the products from the furnace at external pressures not exceeding 100 millitorr. The collected deposit is then warmed to room temperature to volatilize undesired byproducts. Any remaining volatiles can be removed by condensing $P_4F_6$ on a surface which is maintained at −60° C.

The $P_4F_6$ was identified through the utilization of mass specta, nuclear magnetic resonance, and infrared in an inert gas matrix. The structure was found to be: $P(PF_2)_3$.

It was discovered that larger yields of $P_4F_6$ may be obtained even at lower temperature when the $P_2F_4$ gas is mixed with a large excess of an inert material, e.g., xenon at a 5-to-1 ratio by volume. It was also found that impure samples of $P_2F_4$, e.g., containing $PF_2I$, may be utilized without any interference in the production of $P_4F_6$. It is believed that the $P_4F_6$ forms at the liquid nitrogen cooled surface by a series of reactions of PF radicals formed in the furnace itself.

The furnace utilized was 15 cm. in length and had an exit bore of 2 mm. in diameter. In addition, it was composed of quartz and resistance heated by means of a tantalum wire wound around the furnace. The liquid nitrogen cooled surface was positioned approximately 7 cm. away from the exit of the furnace.

$P_4F_6$ is a solid below −68° C. However, it supercools readily to temperatures −90° C. At temperatures above −68° C., it is a viscous, oily, clear liquid. However, it may have a black or orange-yellow tinge due to decomposition. It is quite stable in the liquid phase to about 0° C. Above 0° C. in the liquid phase, $P_4F_6$ decomposes rapidly to $PF_3$ and phosphorus fluoride polymers. It decomposes in the gas phase at pressures above 10 millitorrs readily at all temperatures. The gas phase decomposition is catalyzed by the presence of greases. The vapor pressure of $P_4F_6$ has not been measured, owing to its decomposition in the gas phase, but probably does not exceed 3 torr at 0° C.

$P_4F_6$ fumes in air, although it does not spontaneously catch fire as it oxidizes. It decomposes completely in sodium peroxide solution. When dissolved in acetonitrile, and warmed to room temperatures, it decomposes to $PF_3$ and phosphorus-fluoride polymers. However, a solution of $P_4F_6$ in carbon disulfide was found to be completely stable at room temperature. When a solution of $P_4F_6$ dissolved carbon disulfide was brought into contact with air, voluminous white fumes were given off and the $P_4F_6$ rapidly decomposed to phosphorus-fluorine polymers or phosphorus oxides. Such a solution could be utilized as an initiator or catalyst for a free radical chain mechanism or polymerization process or as a herbicide. The solution could also be used as an oxygen "getter" for reactions in carbon disulfide.

Although I have described my invention with a certain degree of particularity, I wish it to be understood that I do not desire to be limited to the exact conditions shown and described, for obvious modifications will occur to a person skilled in the art.

Having described my invention, I claim:

1. The compound $P_4F_6$; having the structure $P(PF_2)_3$.

2. A method for the production of $P_4F_6$ comprising; the subjection of $P_2F_4$ gas to a temperature of around 750° C. to 950° C. at low pressures, contacting the resultant products with an adjacent surface maintained at liquid nitrogen temperature to form a deposit on said surface, warming the collected deposits to room temperature to remove volatiles, and collecting the $P_4F_6$ by low temperature fractional distillation.

3. A method in accordance with claim 2 wherein the $P_2F_4$ gas is mixed with xenon in a 1-to-5 ratio by volume.

4. A method in accordance with claim 3 wherein the $P_2F_4$ gas contains $PF_2I$ as an impurity.

5. A solution consisting of $P_4F_6$ dissolved in carbon disulfide without exposure to air.

6. A solution in accordance with claim 5 wherein the solution is maintained at room temperature.